May 13, 1947.   E. H. LICHTENBERG ET AL   2,420,319
DIRT SCRAPING AND HAULING VEHICLE
Filed May 15, 1942   4 Sheets-Sheet 2
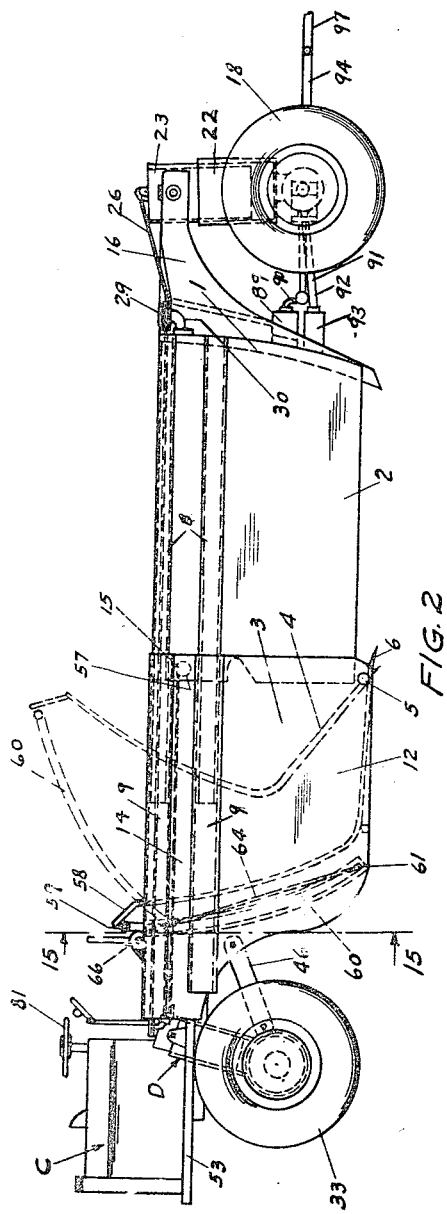
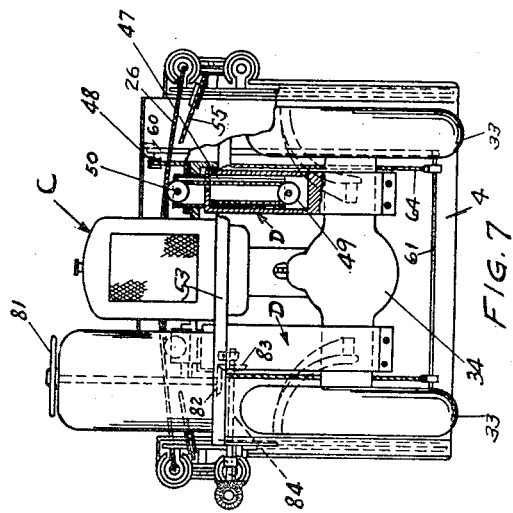
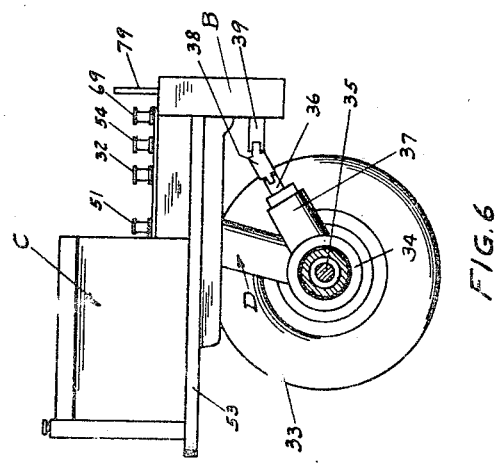
E. H. Lichtenberg and
J. W. Robb   Inventors
By Robb & Robb
Attorneys May 13, 1947.  E. H. LICHTENBERG ET AL  2,420,319
DIRT SCRAPING AND HAULING VEHICLE
Filed May 15, 1942  4 Sheets—Sheet 3
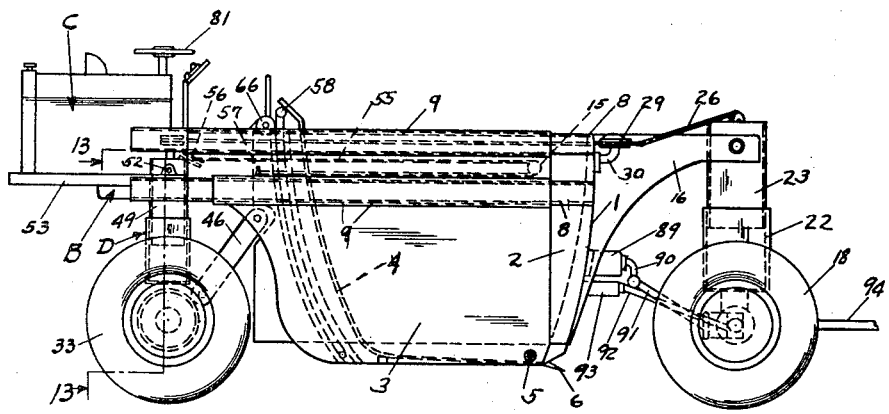
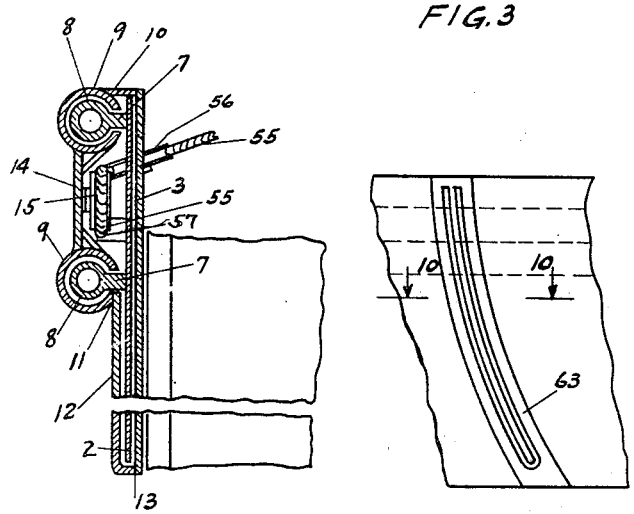

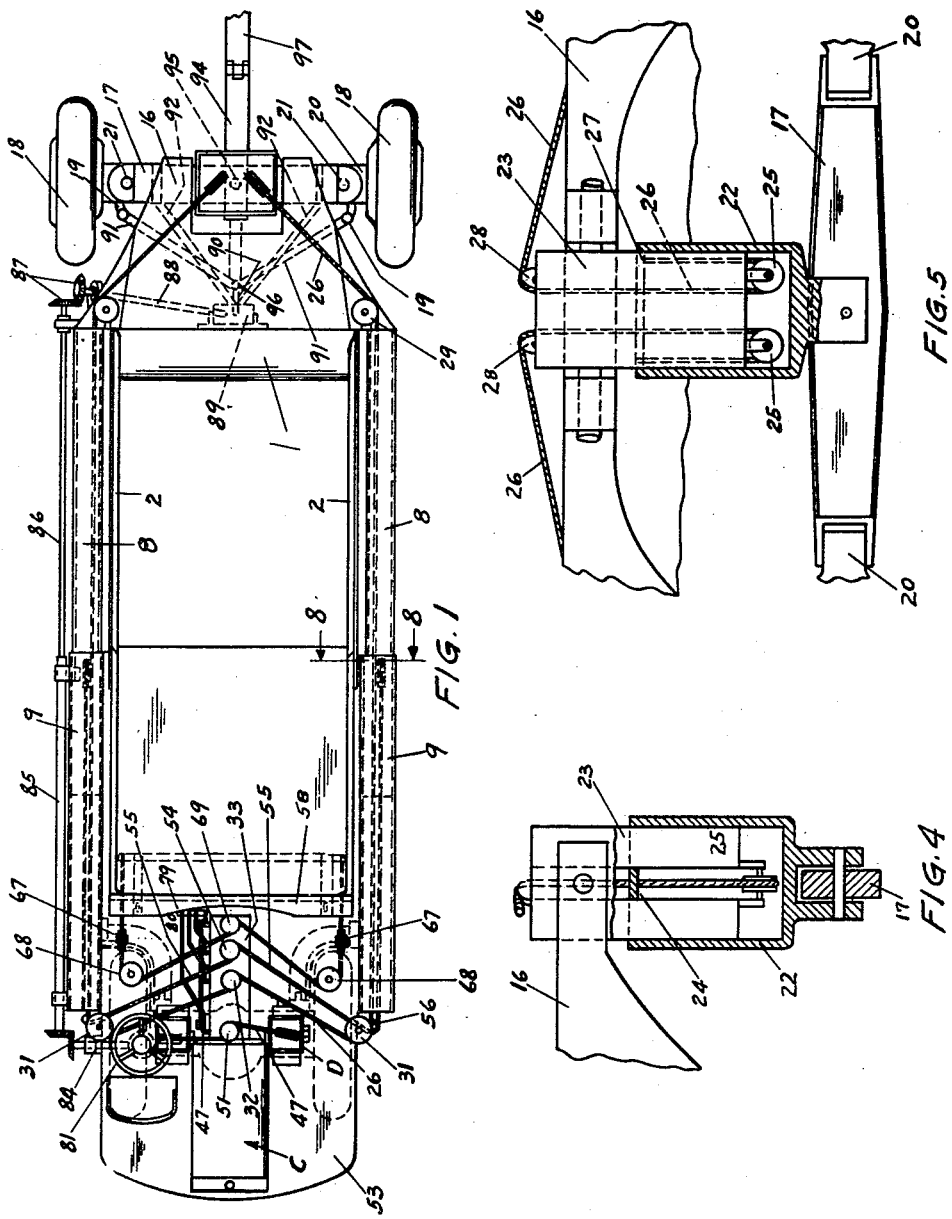

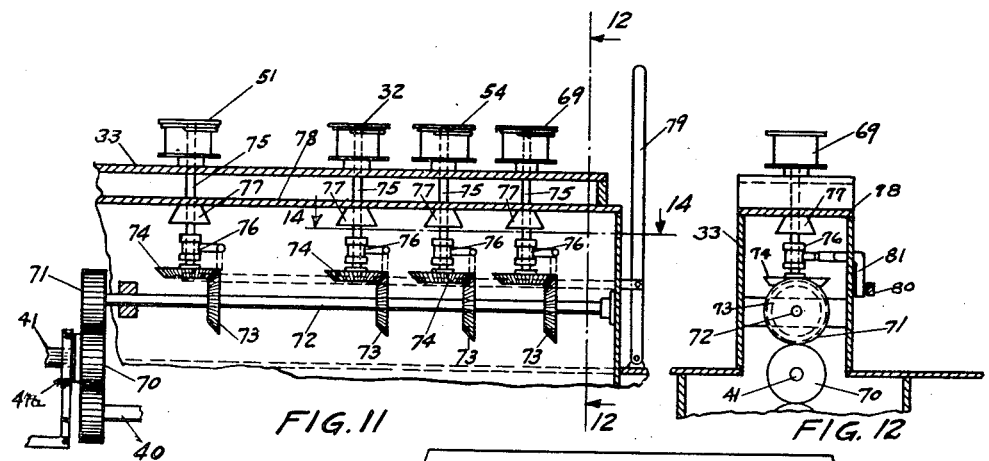
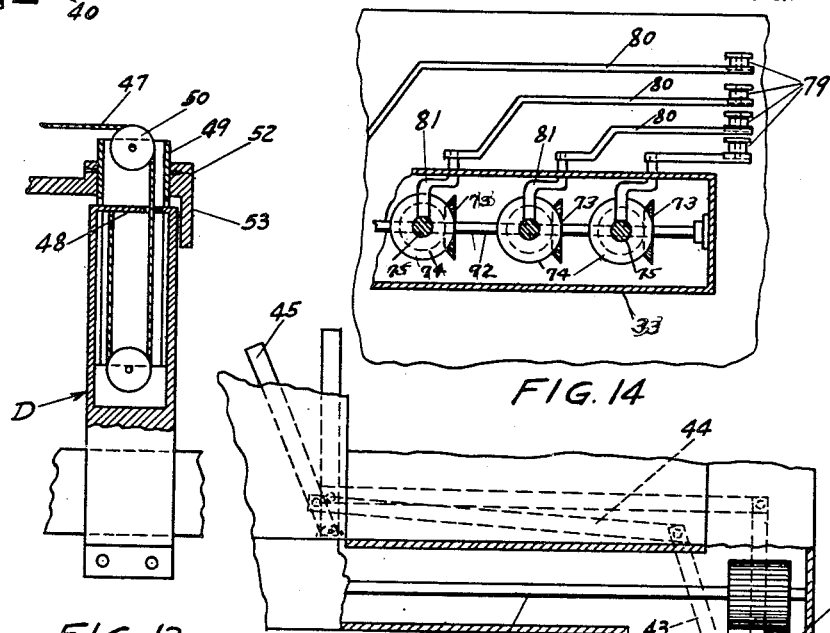
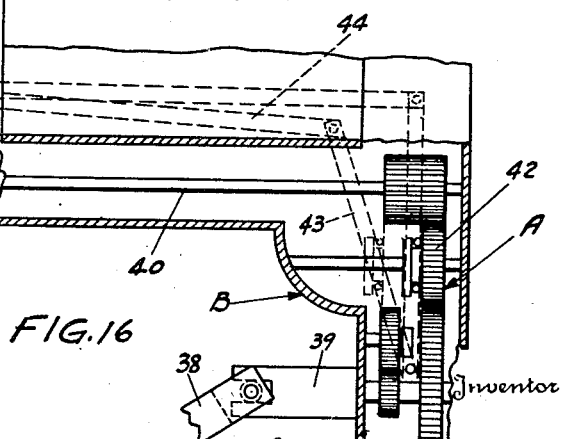

Patented May 13, 1947

2,420,319

UNITED STATES PATENT OFFICE 2,420,319

DIRT SCRAPING AND HAULING VEHICLE

Erich H. Lichtenberg, Milwaukee, Wis., and Frank B. Robb, Chagrin Falls, Ohio, assignors to Koehring Company, Milwaukee, Wis., a corporation Application May 15, 1942, Serial No. 443,144

9 Claims. (Cl. 37—126)

The purpose of the present invention has been to devise an improved construction of dirt carrying and scraper vehicle, as disclosed in the copending application of Walter R. Anderson, Serial No. 414,862, filed October 12, 1941, in which the body is comprised of movable sections, means being provided to raise and lower the ends of the body as desired to facilitate the carrying, scraping and unloading functions, and, likewise, effect opening and closing movement of the body sections.

A primary object of the invention has been to devise novel cable controlling instrumentalities for a scraper vehicle of the type referred to, wherein the body of the vehicle is comprised of bodily movable sections, adapted to be opened and closed relatively to each other, so to speak, opened when the scraping means is being employed to load the vehicle, and closed preliminary to the travel movement of the vehicle to carry the load to a suitable point of deposit or spreading.

A further object of the invention has been to so design the cable controlling instrumentalities by which the sections of the body of the vehicle are closed and opened in the manner stated, as well as the raising and lowering of the body upon its supporting wheels properly controlled so as to provide economical means of operation of this type, in a scraper vehicle of the general class above referred to.

Still another object of the invention has been to provide cable controlling means for effecting the closing together of the body sections of the vehicle, which means likewise is capable of performing the additional function of elevating the front end of the vehicle either incident to the closing action of the sections of the body, or independently thereof.

A further object of the invention has been to provide cable controlling means of the nature above described, wherein the said cable means for effecting closing operation of the body sections may enter into special functional cooperation with the cable means for opening or moving apart said sections so that an independent elevating operation of the front end of the vehicle may be performed when and if desired, under manual control.

The construction of the vehicle of the present invention includes other details of specific novelty, which will be understood, along with those previously referred to, upon reference to the following description, and to the accompanying drawings.

In the drawings:

Figure 1 is a top plan view of a vehicle comprising the structure and other features above referred to, being one type of embodiment of the invention.

Figure 2 is a side elevation of the vehicle, dotted lines illustrating the rear dirt holding and dumping apron carried by the rear section of the vehicle body, as when tilted to its dumping position, from its dirt receiving and holding position, also largely illustrated in dotted lines.

Figure 3 is a side elevation similar to Figure 2, but showing the sections of the body in their closed positions as distinguished from Figure 2, wherein the sections are disposed in their separate or open positions for receiving the dirt or other material to be hauled away by the vehicle. In Figure 3 the body of the vehicle is illustrated as when elevated for travel movement.

Figure 4 is a fragmentary detail sectional view showing the disposition of the cable means of the front raising and lowering unit connecting the forward end of the body with the front axle of the vehicle.

Figure 5 is a front fragmentary view showing primarily the means illustrated in Figure 4.

Figure 6 is a view of the rear truck and power plant arrangement of the vehicle illustrating the disposition of the winding drums for the several controlling cables.

Figure 7 is a rear view of the vehicle or machine, in elevation, revealing the general structural characteristics of the body mounting at the rear end, and certain controlling cables, steering and other instrumentalities.

Figure 8 is a fragmentary vertical sectional view taken about on the line 8—8 of Figure 1, showing more clearly the manner in which the sides of the body front and rear sections are united for relatively slidable bodily movement, and illustrating also the cable arrangement adjacent thereto.

Figure 9 is a detail view illustrating more fully guide means as carried by the inner portions of the sides of the rear section of the body for cooperation with the cross shaft linkedly connected to the rear dirt receiving and dumping apron.

Figure 10 is a fragmentary sectional view taken about on the line 10—10 of the side of the machine opposite that shown in Figure 9, looking in the direction of the arrows.

Figure 11 is a fragmentary view illustrating more fully the mounting of the winding drums and operating means therefor, and the drive from the engine shaft thereto.

Figure 12 is a fragmentary vertical sectional view taken about on the line 12—12 of Figure 11, looking in the direction of the arrows.

Figure 13 is a sectional view taken about on the line 13—13 of Figure 3, illustrating cable arrangement of one of the rear raising and lowering units for the rear end of the vehicle body.

Figure 14 is a fragmentary horizontal sectional view taken about on the line 14—14 of Figure 11.

Figure 15 is a fragmentary vertical sectional view taken about on the line 15—15 of Figure 2, looking forwardly, and showing more clearly the link connection between each end of the apron raising shaft and the upper rear portion of the dirt carrying and dumping apron of the rear body section of the vehicle.

Figure 16 is a fragmentary view of the transmission gearing and controls therefor for driving the rear axle unit.

Referring particularly to Figures 1, 2 and 3 of the drawings, it will be observed that the vehicle body is made up of a front section including the front end 1 and the spaced sides 2 extending rearwardly therefrom. The rear section of the vehicle comprises the sides 3, carrying at their lower front end portions the rear apron or bowl member 4, which is pivotally mounted at 5 near the said front lower ends of the sides 3, and carries the scraper blade 6, projecting forwardly from the pivotal axis or support 5, which spans the space between the sides 3.

As previously indicated, the front and rear sections of the vehicle are designed for bodily movement relatively to one another, and for this purpose, they are slidably connected by telescoping parts which will now be described in conjunction with Figure 8 of the drawings.

As seen in Figure 8, each side member 2 of the front section is formed with offstanding arms 7 in superposed relation, these arms having tubular guide members 8 supported thereby, and extending longitudinally of the front body section, parallel with each side 2 thereof. The guide members 8, two of which are provided on the outer side of each side 2 of the front body section, are received by and operate in a cooperating pair of guide members 9 of tubular form, which are attached to each side 3 of the rear body section.

The upper guide members 9 are suitably welded at 10 to an offstanding flange of the supporting section side 3 and the lower guide members 9 are similarly welded at 11 to the upper edges of the supporting plates 12 attached to the sides 3 of the rear body section, as by welding at 13. The pair of guide members 9 at each side of the rear body section are connected by a web 14, which may be welded or otherwise suitably attached thereto, to give proper strength and rigidity to the construction.

Carried by the webs 14 at the inner sides thereof, and near the front ends of the webs, are the cable pulleys 15, one at each side of the vehicle.

From the foregoing, therefore, it will be observed that the parts 8 and 9 afford sliding telescoping guide means rigidly connecting the front and rear body sections of the vehicle against relative vertical movement, but permitting the free relative longitudinal movement of said sections as they may shift to and from the open position illustrated in Figure 2, and the closed position shown in Figure 3.

*Wheeled supporting means and raising and lowering means for the vehicle body*

The front body section of the vehicle has a forwardly extending arm 16 projecting therefrom, as seen in Figures 1 to 3, and this arm is bifurcated so as to receive therebetween the raising and lowering unit provided between the front end of the vehicle and the front truck, which includes the supporting axle 17, front wheels 18, stub axles 20, and steering arms 19 offstanding rearwardly from the stub axles 20.

The raising and lowering unit at the front end of the vehicle includes an outer tubular member 22, and an inner bifurcated plunger member 23, seen, as to its bifurcated structure, best in Figure 4. These members 22 and 23 may be rectangular in cross-section as illustrated, or otherwise suitably formed. The member 22 has a top cross plate or bar 24, and near the lower ends of the member 23 are mounted the pulleys 25, as seen in Figures 4 and 5.

Two cables are used with the hoisting unit now described, each cable designated 26, being dead-ended at 27 on the cross plate 24, thence passing downwardly around its cooperating pulley or sheave 25, thence passing upwardly over a pulley 28 mounted on the upper end of the bifurcated tubular member 23, which is virtually a plunger working in the member 22 with telescopic action.

From the pulley 28 each hoisting cable 26 passes outwardly to the side of the vehicle over a guide sheave 29 mounted on a bracket 30 at the front end of the front body section of the vehicle and actually supported by the front end 1 of said section. Thence each of the cables 26 passes rearwardly through the adjacent upper tubular guide member 8 of the front body section of the vehicle, and therefrom said cable passes through the upper tubular guide member 9 of the rear body section adjacent thereto.

Near the rear end of the vehicle, each cable 26 passes around a rear guide sheave 31, and thence laterally and inwardly respecting the vehicle body to a point of attachment and winding upon the drum 32, which is supported above a housing 33 at the rear of the rear body section of the vehicle. Rotation of the drum 32 by means to be later described in opposite directions will exert a pull or pay out the cables 26, which wind about the drum from opposite directions at which the said cables extend to the drum pulleys 31. These cables 26, as previously indicated, perform a dual function. If the relative bodily closing movement of the body sections of the vehicle is not resisted, the winding of the cables 26 on the drum 32 will initially pull the front and rear sections of the body together for their closing movement to the positions of Figure 3, and when the said sections are closed in this manner, the additional pull on the cables will tend to raise the tubular plunger member 23, within the member 22 of the front raising and lowering unit described, thereby to elevate the front end of the body of the vehicle, ready for travel movement, or with the scraper blade 6 disengaged from the ground.

Passing now to the means for raising and lowering the rear end of the vehicle body, and the associated wheeled supporting and driving means, reference is made to Figures 2, 6 and 7, also Figures 11 to 13 inclusive. As seen in Figure 7, rear supporting wheels 33 are employed, and are connected by a conventional automotive type axle unit including the customary differential housing 34, in which the driving axles, one of which is shown at 35 in Figure 6, are mounted and connected by the differential gearing of conventional type commonly in use.

From the gear housing 34 there leads forwardly the drive shaft 36 splined and mounted in the tubular member 37 extending forwardly from the housing 34. The said shaft 36 has a universal joint connection 38 with a shaft 39, seen best in Figure 16, said shaft 39 being adapted to be driven in forward and reverse directions by transfer gearing A in a transfer housing B, see Figure 16, which transfer gearing is operated by a shaft 40, in turn driven by the engine shaft 41 of the motor C, and carried by the rear truck or axle unit of the vehicle above the wheels 33. A suitable clutch unit 41a of conventional construction is provided to connect the drive shaft 41 with the drive gear 70.

The transfer gearing A includes a shiftable gear 42 operable by a lever 43, link 44, and a hand lever 45. In order to brace and tie the rear axle unit of the vehicle to the rear body section, there are provided link brace members 46, and these members 46 articulate slightly in the raising and lowering of the body relatively to the rear axle unit.

Extending upwardly from the ends of the housing 34 of the rear axle members 35 are disposed the parts of the raising and lowering means for the rear portion of the body of the vehicle. These means include two raising and lowering units D, each of which is of substantially the same construction as the front raising and lowering units of Figure 5, as respects the employment of the tubular part 22, the inner bifurcated plunger member 23 and mode of attachment of cables 47, one of which is provided for each of the units.

In other words, the units D each have a single raising cable therein instead of two cable members and pulleys, as shown in Figure 5, each cable 47 being dead-ended on the cross plate 48 of the unit D, and leading out of the upper end of the inner tubular member 49 over a pulley 50. From the pulley 50, each cable 47 extends toward the longitudinal axis of the body to a point of attachment and winding about a drum 51. It is obvious that by winding of the cables 47 around the drum 51, the inner members 49 of the rear raising and lowering units D will be caused to rise and effect the elevation of the rear end of the vehicle because said rear members 49 are connected at their upper ends pivotally, as seen at 52, to a rearwardly extending bar or platform 53 projecting from the rear ends of the sides 3 of the rear body section. In other words, the platform 53 is virtually a rigid cross piece or structure connecting the sides 3 of the rear body section to hold the sides in proper parallel relation and to support the motor C and other mechanical devices driven thereby and arranged at the rear of the vehicle.

It will be understood that the inner tubular members 49 of the rear raising and lowering units D, being pivotally connected at 52 to the platform 53, pass through longitudinally elongated openings in the platform thereby being permitted to have a certain amount of forward and rearward swinging movement which is necessary for the articulation of these members and the links 46, incident to the raising and lowering action of the rear end of the body.

The means for opening or separating the body sections by bodily movement thereof includes a drum 54 having cables 55 to wind therearound, said cables extending from the drum outwardly in opposite directions. Each cable 55 passes to a pulley 56 on the upper rear end portion of the adjacent web 14, previously referred to, as carried in spaced relation one at each side of the rear body section.

From the pulley 56, the cable 55 extends forwardly through the space between the adjacent web and side 3 of the rear body section of the vehicle in which same space there is permitted to freely move the adjacent side 2 of the front body section, see Figure 8. Each cable 55 passes over the sheave 15, previously described as located at the front end of the web 14, and thence around the pulley backwardly to a point of dead-ending 57, where it is attached to the adjacent side 2 of the front body section. Thus the winding action of the cables 55 on the drum 54 and mode of passing the cables around the pulleys 56 and 15 will positively pull the front body section forwardly when said section is in its closed position, or any other position than the wide spread open one shown in Figure 2, and during this movement, of course, the body sections will be guided in their relative horizontal movement by means of the tubular guide members 8 and 9, which telescope relatively to one another.

*Means for raising and lowering the dirt supporting and dumping apron*

This means is illustrated best in Figures 2, 3, 9, 10, 11 and 15. The rear upper end of the apron 4 is provided with an extension 58, to which are pivotally connected at 59, a pair of lifting links 60, the lower ends of which are pivotally connected with a cross shaft or bar 61. The cross shaft or bar has its ends provided with rollers 62, which operate in grooved guides 63, attached to the inner portions of the sides 3 of the rear body section.

Suitable cables 64 are attached to the cross bar 61 and lead upwardly adjacent to the rear end of the rear body section over pulleys 66, mounted on upstanding arms 67, carried by the platform 53. The cables pass over and from the pulleys 67 to other guide pulleys 68, from which they lead to the operating drum 69.

Winding of the cables 64 on said drum will obviously raise the apron 4 from its lower position, as shown in Figure 2, to its dumping position, as shown in said figure, in dotted lines, by reason of the raising action of the cross bar or shaft 61, and the upward push of the links 60. Unwinding of the cables 64 from the drum 69 will likewise permit of lowering of the apron. The raising movement of the apron 4 is the one which affects the dumping of the contents from the vehicle body.

*Drive mechanism for the various cable drums*

Referring to Figures 11, 12 and 14, particularly, it will be seen that the engine drive shaft of the motor C is designated 41, as previously referred to, and is equipped with a drive gear 70, meshing with a driven gear 71 on a countershaft 72. The countershaft 72 is equipped with a series of bevel gears 73, which bevel gears mesh with similar gears 74 that are carried by the drum shafts 75, and rotate freely thereon, the shafts 75 having secured thereto for rotation therewith the several drums 32, 51, 54 and 69, previously described.

Suitable clutch and brake members 76 are utilized for drivingly connecting the shafts 75 with the gears 74, and are splined upon the shaft 75 so as to be shiftable into and out of clutching engagement with the gear 74, the upper ends of the members 76 having brake elements to cooperate with stationary brake members 77, supported by the upper portion 78 of the housing for the various gears 73 and 74. Suitable hand levers 79 are connected by links 80, and throw cranks 81, by which to raise and lower the clutch and brake members 76, the latter when lowered drivingly connecting the gears 74 to the shaft 75, and when raised sufficiently, the members 76 will have brake cooperation with the shaft 75 against movement or controlling the movement of the drums for paying out of the cables when the latter are not being wound upon the drums.

Steering mechanism

This mechanism is seen best in Figures 1 and 7. Any conventional steering mechanism may be employed for acting upon the front wheels 18, within the purview of the invention, such mechanism not being material and not forming any special feature of the invention.

Referring to Figure 1, a steering wheel 81 is shown and the steering shaft of this wheel is connected by bevel gears 82 and 83, with the shaft 84, horizontally arranged, and leading to one side of the vehicle. The shaft 84 is connected by bevel gears to a shaft comprising telescoping splined sections 85 and 86, which telescope one within the other, the shaft section 86 having geared connection at its front end by gears 87 to the steering shaft 88, which leads into a gear box 89, containing any conventional connecting parts, such as a worm and sector unit, the sector carrying an arm 90 pivotally connected with the steering links 91, which are attached to the steering arms 19 on the stub axles 20. Obviously, turning of the steering wheel 81 in opposite directions will enable the shifting of the arms 19 in opposite directions for correspondingly moving the wheels 18 about the axis points 21 of the stub axles 20.

Intermediate the ends of the front axle 17, there may be provided suitable brace bars 92 for bracing the connection between the said axle and front truck unit, and the front body section 2, the rear ends of the brace bars being attached by ball and socket or universal joint connections to the lower front side of the front end of the forward body section of the vehicle, as shown at 93.

Operation of the vehicle

Summarizing the operation of the vehicle, it is apparent that the direction of forward movement may be controlled by the steering wheel 81. However, there is provision made of a coupling bar 94 on the front axle 17 pivoted at 95 to the axle and having its rear end connected at 96 to the point of connection of the arm 90 with the links 91. The coupling bar 94 is adapted to be connected with a traction or pulling vehicle of some kind as by the draw bar 97 so that under these conditions, if the vehicle is pulled by another vehicle, the steering mechanism, previously described, is not caused to function. The pivotal movement of the coupling bar 94 will cause proper turning movement of the wheels 18 through the linkage 91 under such conditions.

Assuming that the vehicle body sections are disposed, as in Figure 2, which is the digging or scraping position thereof, and that the apron 4 is in its lowered position for receiving the material excavated, the vehicle will be pulled by a traction machine, or it may be caused to move under the power of its own self-contained power plant including motor C in a forward direction. This causes the scraper 6 to act, and material is scraped and caused to enter the rear body section of the vehicle, and be received on the supporting apron 4.

When a load has been caused to be received by the apron 4 in the rear body section 3 and the operator is ready to cause travel of the machine to a point of depositing of the material, the drum 32 is caused to operate the cable 26 and the body sections of the vehicle are moved telescopically together so that the front section 2 closes the rear section 3, and the material is held within the vehicle at about the end of the closing movement of the said body sections.

The pull upon the cables 26 is transmitted to the front raising and lowering unit, including the members 22 and 23, and relative upward movement of the member 23 raises the front end of the vehicle through its connection with the forwardly extending arm 16. At about this time the operator causes operation of the drum 51 and cables 47 connected therewith to operate the members of the two rear raising and lowering units D, and thereby, the rear end of the vehicle is elevated. The vehicle is then in the condition substantially as shown in Figure 3, and can travel to any suitable point where the material in the vehicle is to be deposited. Then the operator causes to be operated the drum 54, and the cables 55, to thereby effect a separating or opening movement of the body sections 2 and 3 relatively to each other, and when this is done, the drum 69 is caused to be operated to actuate the cables 67 and thereby raise the links 60 moving the apron 4 upwardly to its dumping position illustrated in the forward dotted lines of Figure 2, thereby forcibly ejecting, so to speak, the loaded materials in the vehicle therefrom.

The vehicle now being emptied, the cable operating drums suitably provided for such purpose will be released to permit the raising and lowering units at the front and rear ends of the machine to lower these ends when the vehicle is back to the point of loading again, and the scraper 6 will then be properly adjusted for its further scraping action to load the vehicle, the load supporting and dumping apron 4 being previously lowered.

Having thus described our invention, what we claim as new and desire to secure by Letters Patent of the United States, is:

1. In a dirt hauling vehicle of the class described, in combination, a body comprising front and rear bodily movable sections, wheeled trucks supporting the body at its front and rear ends, and respectively connected with the front and rear body sections, a raising and lowering unit for the front of the vehicle intermediate same and the front truck, raising and lowering units intermediate the rear of the vehicle and the rear truck for raising the rear end of the vehicle, means for causing relative movement of the body sections to open the same, and cable means for causing bodily movement of the body sections to close the same together and connected with the front raising and lowering unit for effecting operation of the latter.

2. In a dirt hauling vehicle of the class described, in combination, a body comprising front and rear bodily movable sections, wheeled trucks supporting the body at its front and rear ends and respectively connected with the front and rear body sections, a raising and lowering unit for the front of the vehicle intermediate same and the front truck, raising and lowering units intermediate the rear of the vehicle and the rear truck for raising the rear end of the vehicle, means for causing relative movement of the body sections to open the same, and cable means for causing bodily movement of the body sections to close the same together and connected with the front raising and lowering unit for effecting operation of the latter, the means for closing and opening the body sections by relative movement including independently controllable instrumentalities.

3. In a dirt hauling vehicle of the class described, in combination, a body comprising front and rear bodily movable sections, wheeled trucks supporting the body at its front and rear ends and respectively connected with the front and rear body sections, a raising and lowering unit for the front of the vehicle intermediate same and the front truck, raising and lowering units intermediate the rear of the vehicle and the rear truck for raising the rear end of the vehicle, means for causing relative movement of the body sections to open the same, cable means for causing bodily movement of the body sections to close the same together and connected with the front raising and lowering unit for effecting raising operation of the latter, and connections between the bodily movable sections of the body comprising instrumentalities slidable relative to each other.

4. In a dirt hauling vehicle of the class described, in combination, a body comprising front and rear bodily movable sections, wheeled trucks supporting the body at its front and rear ends and respectively connected with the front and rear body sections, a raising and lowering unit for the front of the vehicle intermediate same and the front truck, raising and lowering units intermediate the rear of the vehicle and the rear truck for raising the rear end of the vehicle, means for causing relative movement of the body sections to open the same, and cable means common to the body sections and said front unit for causing bodily movement of the body sections to close the same together and connected with the front raising and lowering unit for effecting operation of the latter.

5. In a vehicle of the class described, in combination, a body comprising front and rear relatively movable body sections, connections between said body sections whereby they slide longitudinally relatively to one another in their bodily movement, raising and lowering units at the front and rear ends of the body, trucks at the front and rear ends of the body connecting with the adjacent raising and lowering units and a single cable operating mechanism for effecting closing bodily movement of the body sections and the raising action of the raising and lowering unit at the front end of the vehicle, and means for operating the raising and lowering unit at the rear end of the vehicle.

6. In a vehicle of the class described, in combination, a body comprising front and rear relatively movable body sections, connections between said body sections whereby they slide longitudinally relatively to one another in their bodily movement, raising and lowering units at the front and rear ends of the body, trucks at the front and rear ends of the body connecting with the adjacent raising and lowering units and a single cable operating mechanism for effecting closing bodily movement of the body sections and the raising action of the raising and lowering unit at the front end of the vehicle, and cable means for operating the raising and lowering unit at the rear end of the vehicle, the rear body section of the vehicle comprising a dirt supporting and dumping apron pivotally connected therewith, and a scraper disposed at the front lower portion of the rear body section.

7. A vehicle of the class described, comprising a body composed of front and rear body sections, said body sections having telescoping guide members at opposite sides thereof interengaging so as to permit longitudinal sliding movement of the body sections relatively to each other, cable means including a cable operating drum, and cables leading from the drum through certain of the telescoping guide members aforesaid and connected to the front end of the vehicle for causing closing or collapsing together of the body sections.

8. A vehicle of the class described, comprising a body composed of front and rear body sections, said body sections having telescoping guide members at opposite sides thereof interengaging so as to permit longitudinal sliding movement of the body sections relatively to each other, cable means including a cable operating drum, cables leading from the drum through certain of the telescoping guide members aforesaid and connected to the front end of the vehicle for causing closing or collapsing together of the body sections, and other cable means including a cable operating drum and cables leading therefrom extending along the sides of the vehicle and connected to the rear end of the front body section of the vehicle and having moving connection with the rear body section for effecting a separating or opening movement of the body sections.

9. A vehicle of the class described, comprising a body composed of front and rear body sections, said body sections having telescoping guide members at opposite sides thereof interengaging so as to permit longitudinal sliding movement of the body sections relatively to each other, cable means including a cable operating drum, and cables leading from the drum through certain of the telescoping guide members aforesaid and connected to the front end of the vehicle for causing closing or collapsing together of the body sections, the vehicle comprising a front truck having a raising and lowering unit thereon with which said cable means for closing the body sections together are connected for actuation of said raising and lowering unit.

ERICH H. LICHTENBERG.
FRANK B. ROBB.

REFERENCES CITED

The following references are of record in the file of this patent:

UNITED STATES PATENTS

| Number | Name | Date |
|---|---|---|
| 1,887,465 | Priestman | Nov. 8, 1932 |